United States Patent
Baumgärtner et al.

(10) Patent No.: US 10,759,259 B2
(45) Date of Patent: Sep. 1, 2020

(54) COMBINED COOLING AND EXTINGUISHING SYSTEM

(71) Applicant: CPT Group GmbH, Hannover (DE)

(72) Inventors: Christoph Baumgärtner, Regenstauf (DE); Joris Fokkelman, Tegernheim (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 34 days.

(21) Appl. No.: 16/329,950

(22) PCT Filed: Aug. 30, 2017

(86) PCT No.: PCT/EP2017/071763
§ 371 (c)(1),
(2) Date: Mar. 1, 2019

(87) PCT Pub. No.: WO2018/041895
PCT Pub. Date: Mar. 8, 2018

(65) Prior Publication Data
US 2019/0193519 A1   Jun. 27, 2019

(30) Foreign Application Priority Data
Sep. 2, 2016 (DE) .................. 10 2016 216 619

(51) Int. Cl.
*B60H 1/32* (2006.01)
*A62C 3/07* (2006.01)
(Continued)

(52) U.S. Cl.
CPC ............... *B60H 1/323* (2013.01); *A62C 3/07* (2013.01); *A62C 99/0018* (2013.01);
(Continued)

(58) Field of Classification Search
CPC ...... A62C 3/07; A62C 99/0018; B60H 1/323; B60H 1/00978; B60H 1/3222; F24F 11/33
(Continued)

(56) References Cited

U.S. PATENT DOCUMENTS 4,248,309 A * 2/1981 Hofle .................... A62C 3/07
169/14
5,515,691 A   5/1996 Wertenbach et al. ........... 62/133
(Continued)

FOREIGN PATENT DOCUMENTS

DE    37 01 086 A1   8/1988   ............... B60H 1/00
DE    695 25 767 T2  1/2003   ............... A62C 3/07
(Continued)

OTHER PUBLICATIONS

German Office Action, Application No. 10 2016 216 619.0, 5 pages, dated Jul. 13, 2017.
(Continued)

*Primary Examiner* — Steven J Ganey
(74) *Attorney, Agent, or Firm* — Slayden Grubert Beard PLLC

(57) ABSTRACT

Various embodiments include a combined cooling and extinguishing system for a motor vehicle, the system comprising: a cooling system circulating carbon dioxide as a coolant, the cooling system including a compressor, an evaporator, an expansion valve; and a condenser; an extinguishing system including a pressure vessel storing compressed $CO_2$; and a control valve connected to the pressure vessel and to the cooling system. The control valve includes a first setting to supply $CO_2$ from the pressure vessel to the cooling system and a second setting to supply $CO_2$ from the cooling system to the pressure vessel.

8 Claims, 2 Drawing Sheets

(51) Int. Cl.
*B60H 1/00* (2006.01)
*A62C 99/00* (2010.01)
*F24F 11/33* (2018.01)

(52) U.S. Cl.
CPC ....... *B60H 1/00978* (2013.01); *B60H 1/3222* (2013.01); *F24F 11/33* (2018.01)

(58) Field of Classification Search
USPC ................ 169/9, 11, 14, 26, 54, 62; 62/45.1
See application file for complete search history.

(56) References Cited

U.S. PATENT DOCUMENTS

| | | | |
|---|---|---|---|
| 5,934,379 A | 8/1999 | Østlygen et al. ................ | 169/46 |
| 2005/0115253 A1 | 6/2005 | Sienel .............................. | 62/149 |
| 2009/0007578 A1* | 1/2009 | Yabu ..................... | F24F 1/0003 |
| | | | 62/190 |
| 2013/0087347 A1* | 4/2013 | Sieme .................... | A62C 35/68 |
| | | | 169/62 |

FOREIGN PATENT DOCUMENTS

| | | | | |
|---|---|---|---|---|
| DE | 10 2014 223 956 A1 | 5/2016 | .............. | F25B 49/02 |
| EP | 0 675 013 A1 | 10/1995 | ............... | A62C 3/07 |
| WO | 2018/041895 A1 | 3/2018 | ............... | A62C 3/07 |

OTHER PUBLICATIONS

International Search Report and Written Opinion, Application No. PCT/EP2017/071763, 17 pages, dated Dec. 18, 2017.

\* cited by examiner

COMBINED COOLING AND EXTINGUISHING SYSTEM

CROSS-REFERENCE TO RELATED APPLICATIONS

This application is a U.S. National Stage Application of International Application No. PCT/EP2017/071763 filed Aug. 30, 2017, which designates the United States of America, and claims priority to DE Application No. 10 2016 216 619.0 filed Sep. 2, 2016, the contents of which are hereby incorporated by reference in their entirety.

TECHNICAL FIELD

The present disclosure relates to motor vehicles. Various embodiments may include a combined cooling and extinguishing system for a motor vehicle and/or a motor vehicle having the combined cooling and extinguishing system.

BACKGROUND

Cooling systems or air-conditioning units for motor vehicles typically comprise a compressor, an expansion valve, an evaporator, and a condenser. Within the air-conditioning unit there circulates a coolant which can be, in particular, carbon dioxide ($CO_2$). $CO_2$ is also designated as refrigerant R744. Within the air-conditioning unit, the $CO_2$ can be compressed by the compressor. Here, the compressor is typically driven by means of a belt drive which in turn is driven by an internal combustion engine of the motor vehicle. In the case of known motor vehicles, in particular hybrid vehicles, there is an engine stop function employed in order to reduce the fuel consumption of the motor vehicle.

However, the compressor of the air-conditioning unit is, as described above, usually coupled to the belt drive, and therefore the internal combustion engine must run in order to operate the air-conditioning unit. Although there is always present within the air-conditioning unit a certain latent cold, in particular in a mass of a heat exchanger or evaporator of the air-conditioning unit and of the refrigerant, this latent cold is as a rule already consumed after a few seconds and is no longer available for the cooling in particular of an interior of the motor vehicle. In order further to allow a further cooling of the interior and consequently a travel comfort for passengers of the motor vehicle, the internal combustion engine is as a rule started again, thus making it more difficult to save fuel.

Also known are extinguishing systems for motor vehicles, which comprise $CO_2$ as the extinguishing agent. $CO_2$ is particularly suitable for extinguishing smoldering fires of electronic components, liquid fires of crude oil derivatives and solids fires triggered by crude oil derivatives.

SUMMARY

The teachings of the present disclosure described a cooling system of the type stated at the outset that allows relatively long cooling of an interior of a motor vehicle if the cooling system is not driven by an internal combustion engine of the motor vehicle. For example, some embodiments of the teachings herein may include a combined cooling and extinguishing system (3) for a motor vehicle (1), comprising: a cooling system (4) within which carbon dioxide ($CO_2$) is circulated as the coolant, wherein the cooling system (4) has a compressor (6), an evaporator (8), an expansion valve (7), and a condenser (9), an extinguishing system (5) having a pressure vessel (14) within which compressed $CO_2$ is stored, a control valve (21), wherein the control valve (21) is connected to the pressure vessel (14) of the extinguishing system (5) and to the cooling system (4), and is designed to supply $CO_2$ from the pressure vessel (14) to the cooling system (4) and to supply $CO_2$ from the cooling system (4) to the pressure vessel (14).

In some embodiments, the control valve (21) is designed to take up a position in which it is opened in the direction of the cooling system (4) if the compressor (6) of the cooling system (4) is not driven.

In some embodiments, the control valve (21) is designed to take up a closed position if the compressor (6) is driven.

In some embodiments, the control valve (21) is designed to move into a closed position if the extinguishing system (5) releases $CO_2$ for fighting a fire.

In some embodiments, the control valve (21) is designed to move into a position in which it is opened in the direction of the pressure vessel (14) if the cooling system (4) is situated in a steady state.

In some embodiments, the control valve (21) is an overpressure valve, a thermostat valve, or a solenoid valve.

As another example, some embodiments include a vehicle (1) comprising a combined cooling and extinguishing system (3) as described above.

In some embodiments, there is an internal combustion engine (2) and a belt drive (20), wherein the internal combustion engine (2) is designed to drive the belt drive (20), and the compressor (6) of the cooling system (4) is coupled to the belt drive (20) in such a way that the belt drive (20) can drive the compressor (6).

BRIEF DESCRIPTION OF THE DRAWINGS

Exemplary embodiments of the teachings herein are explained in more detail below on the basis of the schematic drawings which are not true to scale. In the drawings.

DETAILED DESCRIPTION

Figure 1:
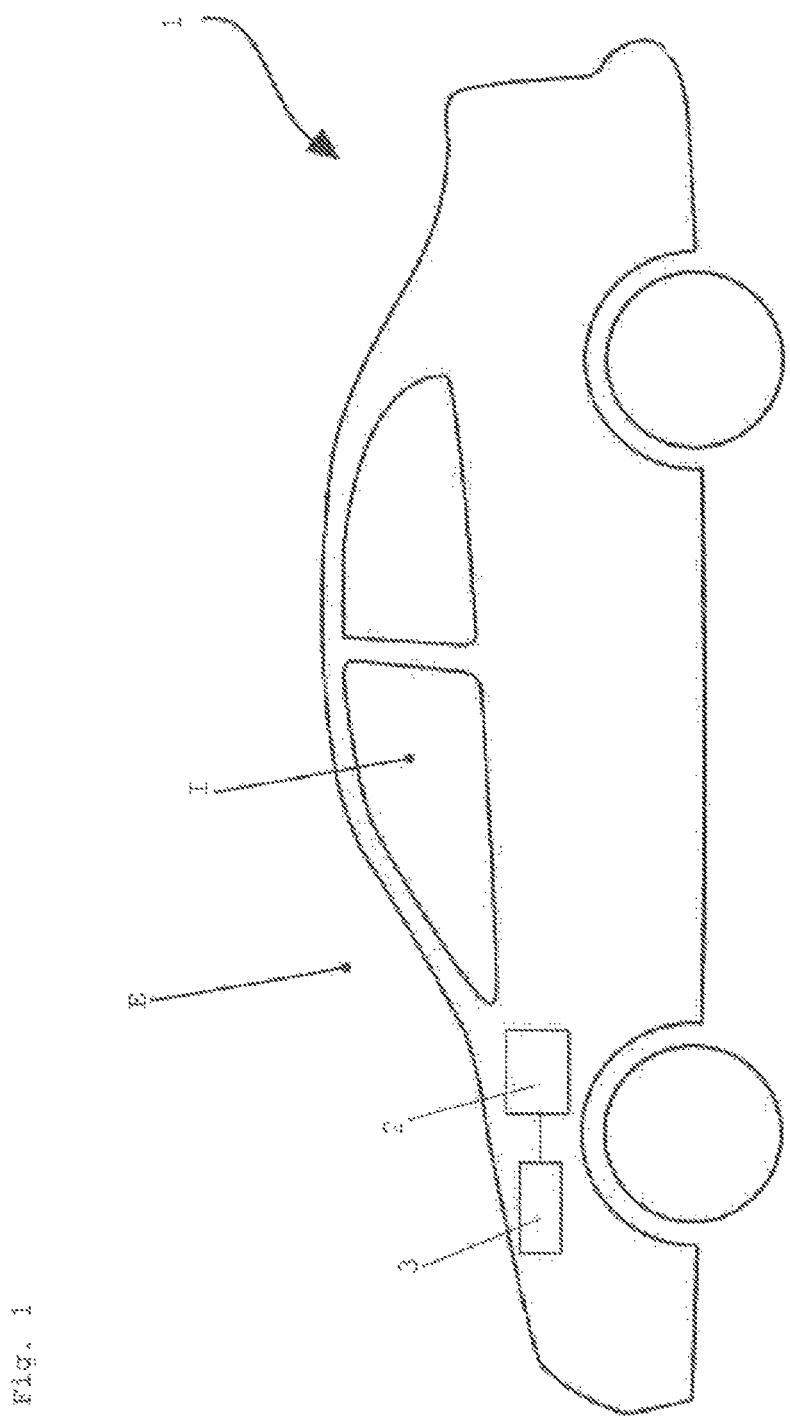
FIG. 1 shows a side view of an embodiment of a motor vehicle incorporating teachings of the present disclosure with an embodiment of a combined cooling and extinguishing system incorporating teachings of the present disclosure.

In some embodiments, a combined cooling and extinguishing system can be used in particular in a motor vehicle. The combined cooling and extinguishing system may comprise a cooling system within which carbon dioxide ($CO_2$) is circulated as the coolant, wherein the cooling system has a compressor, an evaporator, an expansion valve, and a condenser.

The $CO_2$ can be compressed by the compressor with consumption of drive energy which can be provided in particular by an internal combustion engine of the motor vehicle. The $CO_2$ can condense in the condenser, with it being able to release heat at high temperature in particular to an external surroundings of the motor vehicle, corresponding to a condensation temperature which under the high pressure is likewise high. The liquefied $CO_2$ can then be guided to the expansion valve, where it is expanded. Within the evaporator, the $CO_2$ can then absorb heat at low temperature by evaporation, in particular heat of an interior of the motor vehicle. The compressor again sucks in $CO_2$ evaporated by the evaporator, with the result that the cycle is closed.

In some embodiments, the combined cooling and extinguishing system further comprises an extinguishing system having a pressure vessel within which compressed $CO_2$ is stored. The $CO_2$ serves as the extinguishing agent for the extinguishing system in order to fight a fire, in particular in the region of an engine compartment of the motor vehicle.

In some embodiments, the combined cooling and extinguishing system further comprises a control valve connected to the pressure vessel of the extinguishing system and to the cooling system, and designed to supply $CO_2$ from the pressure vessel to the cooling system and to supply $CO_2$ of the cooling system to the pressure vessel. Here, it is in particular possible for $CO_2$ to be supplied from the pressure vessel to a region upstream of the expansion valve or upstream of the compressor or to be removed from said regions for discharge into the pressure vessel.

The supply of $CO_2$ from the pressure vessel into the cooling system makes it possible to increase the capacity of the cooling system, in particular the heat capacity of the coolant within the cooling system, in order in this way to be able to ensure cooling of the interior of the vehicle even in relatively long engine stop phases. Furthermore, the supply of $CO_2$ from the pressure vessel allows a possible leakage of the cooling system to be compensated for. Furthermore, the possibility of supplying $CO_2$ from the pressure vessel into the cooling system does not compromise the extinguishing function of the extinguishing system, since $CO_2$ can also be supplied again, in the reverse direction, from the cooling system to the pressure vessel of the extinguishing system.

In some embodiments, the amount of $CO_2$ in the combined cooling and extinguishing system may be increased in order to make an extinguishing function more effective. In addition, the increased amount of $CO_2$ in the system allows a leakage to be compensated for. A reference variable for determining the amount of $CO_2$ necessary for this purpose then may depend not only on the necessary amount which is necessary for operating the cooling system but also on an amount of $CO_2$ which is needed in order to be able to flood in particular an engine compartment of the motor vehicle with $CO_2$ for a certain time in order to fight a fire.

In some embodiments, the control valve is designed to take up a position in which it is opened in the direction of the cooling system if the compressor of the cooling system is not driven, in particular if the compressor is not driven by an internal combustion engine of a motor vehicle. In the opened position, the control valve is closed in the direction of the pressure vessel and opened in the direction of the cooling system, with the result that compressed or pressurized $CO_2$ can flow out of the pressure vessel into the cooling system, but, conversely, no $CO_2$ can flow out of the cooling system into the pressure vessel. In this way, a $CO_2$ mass within the cooling system can be increased. As a result, the capacity of the cooling system is increased and a particularly long-lasting cooling of the interior of the motor vehicle is made possible.

In some embodiments, the control valve is designed to take up a closed position if the compressor is driven, in particular by means of an internal combustion engine of a motor vehicle. In the closed position, the control valve is closed in the direction of the pressure vessel and closed in the direction of the cooling system, with the result that neither $CO_2$ can flow out of the pressure vessel into the cooling system, nor $CO_2$ can flow out of the cooling system into the pressure vessel. In other words, the pressure vessel is decoupled from the cooling system when the control valve is in a position in which it is closed on both sides. This position of the control valve in which it is closed on both sides is particularly advantageous when the cooling system is started by its compressor being driven, in particular by a belt drive driven by an internal combustion engine of the motor vehicle. The above-described decoupling can ensure that an optimum amount of $CO_2$ is guided in particular to the expansion valve, with the result that a particularly high thermal output of the cooling system is made possible.

In some embodiments, the control valve is designed to move into a closed position if the extinguishing system releases $CO_2$ for fighting a fire. In this closed position, the control valve is closed in particular in the direction of the cooling system, with the result that no $CO_2$ can flow out of the pressure vessel into the cooling system. However, the control valve can be opened in the direction of the pressure vessel, with the result that $CO_2$ can flow out of the cooling system into the pressure vessel. Consequently, a particularly large amount of $CO_2$ for fighting a fire is available to the extinguishing system.

In some embodiments, the control valve is designed to move into a position in which it is opened in the direction of the pressure vessel if the cooling system is situated in a steady state. What can in particular be understood by a "steady state" in this connection is that the cooling system has set or regulated an intended (air) temperature in particular in an interior of the motor vehicle. The control valve is opened in the direction of the pressure vessel, with the result that $CO_2$ can flow out of the cooling system into the pressure vessel. However, the control valve is closed in the direction of the cooling system, with the result that no $CO_2$ can flow out of the pressure vessel into the cooling system. In this way, the amount of $CO_2$ within the pressure vessel can be increased, with the result that a particularly large amount of $CO_2$ for fighting a possible fire is available to the extinguishing system. Furthermore, the increased amount of $CO_2$ within the pressure vessel can be used to be supplied again to the cooling system if its compressor is no longer driven by the internal combustion engine (see above).

In some embodiments, the control valve comprises an overpressure valve, a thermostat valve, or a solenoid valve. Such valves are particularly well suited to realize the above-explained functions of the control valve.

In some embodiments, a vehicle, in particular a motor vehicle comprises a combined cooling and extinguishing system as described above.

In some embodiments, the vehicle further comprises an internal combustion engine and a belt drive, wherein the internal combustion engine is designed to drive the belt drive. Furthermore, the compressor of the cooling system is coupled to the belt drive in such a way that the belt drive can drive the compressor. With regard to further effects, advantages, and embodiments of a vehicle incorporating the teachings herein, reference is made, in order to avoid repetitions, to the above statements and to the following description of the figures.

Figure 2:
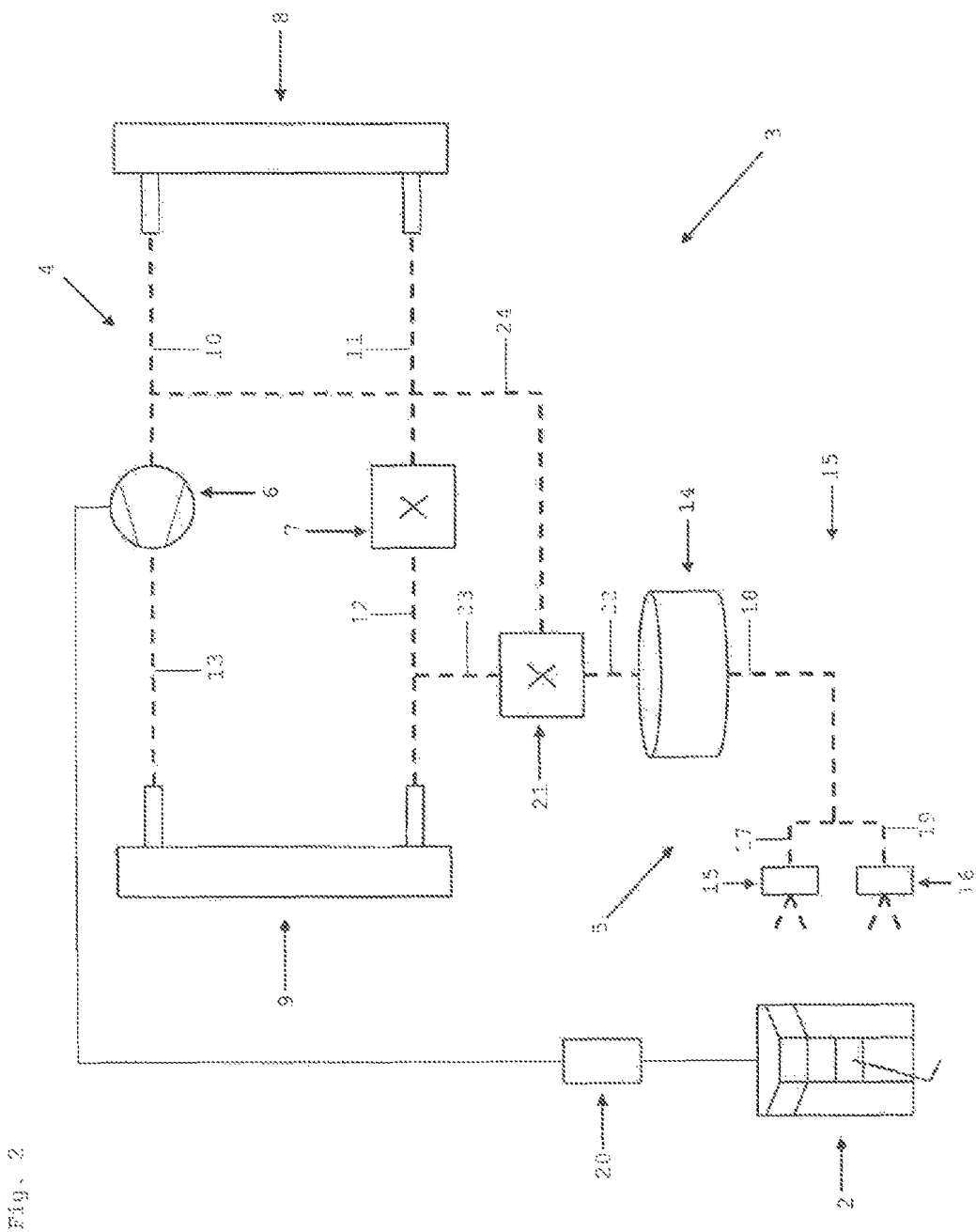
FIG. 2 shows a schematic diagram of an exemplary embodiment of a combined cooling and extinguishing system incorporating teachings of the present disclosure for the motor vehicle shown in FIG. 1.

FIG. 1 shows a motor vehicle 1, e.g., a passenger car in the exemplary embodiment shown, driven by an internal combustion engine 2. Furthermore, the motor vehicle 1 comprises a combined cooling and extinguishing system 3 which has a compressor (FIG. 2) driven by the internal combustion engine 2. FIG. 2 shows the individual components of the combined cooling and extinguishing system 3. Thus, the combined cooling and extinguishing system 3 has a cooling system in the form of an air-conditioning unit 4 and further comprises an extinguishing system 5.

The air-conditioning unit 4 comprises a compressor 6, an expansion valve 7, an evaporator 8, and a condenser 9. The condenser 6 is connected to the evaporator 8 via a first connection line 10. The evaporator 8 is connected to the expansion valve 7 by a second connection line 11. The expansion valve 7 is connected to the condenser 6 via a third connection line 12. The condenser 6 is connected to the compressor 6 via a fourth connection line 13. The compressor 6, the expansion valve 7, the evaporator 8 and the condenser 9 and also the connection lines 10 to 13 form a cooling circuit within which coolant in the form of carbon dioxide ($CO_2$) circulates.

In some embodiments, the $CO_2$ can be compressed by the compressor 6 with consumption of drive energy (which can be provided by the internal combustion engine 2). The $CO_2$ can condense in the downstream condenser 9, with it being able to release heat at high temperature in particular to an external surroundings E (FIG. 1) of the motor vehicle 1, corresponding to a condensation temperature which under the high pressure is likewise high. The liquefied $CO_2$ can then be guided to the expansion valve 7, where the pressure of the $CO_2$ is reduced. Within the evaporator 8, the $CO_2$ can then absorb heat at low temperature by evaporation, in particular heat of an interior I (FIG. 1) of the motor vehicle 1. The compressor 6 again sucks in $CO_2$ evaporated by the evaporator 8, with the result that a cycle is closed.

The extinguishing system 5 has a pressure vessel 14, a first nozzle 15, and a second nozzle 16. Compressed $CO_2$ is stored within the pressure vessel 14. In the embodiment shown, the pressure vessel 14 is connected to the first nozzle 15 via a first branch 17 of a fifth connection line 18 and is connected to the second nozzle 16 via a second branch 19 of the fifth connection line 18. The nozzles 15 and 16 are directed toward the internal combustion engine 2, with the result that $CO_2$ flowing out of the nozzles 15 and 16 can be used for fighting a fire in the region of the internal combustion engine 2. The $CO_2$ within the extinguishing system 5 thus serves as the extinguishing agent.

The internal combustion engine 2 can drive a belt drive 20. The compressor 6 is coupled to the belt drive, with the result that the compressor 6 can be driven via the belt drive 20. In this way, the internal combustion engine 2 can drive the compressor 6 via the belt drive 20.

The combined cooling and extinguishing system 3 further comprises a control valve 21. The control valve 21 is connected on the inlet side to the pressure vessel 14 via a sixth connection line 22. Furthermore, the control valve 21 is connected on the outlet side via a seventh connection line 23 to the third connection line 12 of the cooling system 4 between the condenser 9 and the expansion valve 7. Alternatively, the control valve 21 can also be connected on the outlet side via an eighth connection line 24 to the first connection line 10 between the compressor 6 and the evaporator 8.

The control valve 21 is designed to supply $CO_2$ from the pressure vessel 14 to the third connection line 12 of the cooling system 4 via the sixth connection line 22 and the seventh connection line 23. In this way, additional $CO_2$ can be supplied to the cooling system 4 in a region upstream of the expansion valve 7. In some embodiments, the control valve 21 can be designed to supply $CO_2$ from the pressure vessel 14 to the first connection line 10 via the sixth connection line 22 and the eighth connection line 24. In this way, additional CO2 can be supplied to the cooling system 4 in a region upstream of the compressor 6.

This additional amount of $CO_2$ within the cooling system 4 makes it possible to increase the capacity of the coolant system 4, in particular the heat capacity of the coolant which circulates within the cooling system 4. As a result, a latent cold which is present within the cooling system can be maintained for a relatively long time period if the compressor 6 is no longer operated.

This is particularly the case when the internal combustion engine 2 is switched off, for example by an automatic engine stop function of the motor vehicle 1 that automatically deactivates the internal combustion engine 2, for example during relatively long standstills of the motor vehicle 1 or upon switching over to an alternative drive device, in particular an electric motor. In this case, the internal combustion engine 2 no longer drives the belt drive 20 to which the compressor 6 is typically firmly coupled. If the compressor 6 is no longer driven, it lacks the necessary drive energy to compress and to deliver $CO_2$. Consequently, compression and delivery of $CO_2$ is stopped. The cooling system 4 thus comes "to a standstill". The additional amount of $CO_2$ which has been supplied to the cooling system 4 ensures, with the cooling system 4 standing still, that the latent cold within the cooling system 4 is later consumed, and, ultimately, even when at a standstill for a relatively long time period, the cooling system 4 can absorb heat from air in particular from the interior I of the motor vehicle 1 and can in this way cool the interior I for longer. In addition, the increased amount of $CO_2$ in the cooling system 4 allows a leakage of $CO_2$ to be compensated for.

In some embodiments, the control valve 21 may be configured to decouple the pressure vessel 14 from the third connection line 12 or the first connection line 10 of the cooling system 4 if the cooling system 4 is started. What can be understood in particular by "started" is that the compressor 6 is driven (again) via the belt drive 20 by the internal combustion engine 2. Decoupling can furthermore also occur when the extinguishing system 5 requires $CO_2$ for fighting a fire in the region of the internal combustion engine 2.

Decoupling of the pressure vessel 14 from the third connection line 12 or the first connection line 10 of the cooling system 4 occurs, in some embodiments, by the control valve 21 moving into a closed position or being moved into the closed position in which the sixth connection line 22 and the seventh connection line 23 or the eighth connection line 24 are not connected to one another. In this way, no additional amount of $CO_2$ is supplied to the cooling system 4 from the pressure vessel 14. Conversely, no $CO_2$ is supplied to the pressure vessel 14 from the cooling system 4 either. In other words, the control valve 21 is situated in a position in which it is closed on both sides. The above-described decoupling can ensure that, in particular during a starting phase of the cooling system 4 in which an intended temperature for example of the interior I of the motor vehicle 1 has not yet been set, an optimum amount of $CO_2$ is guided in particular to the expansion valve 7, with the result that a particularly high thermal output of the cooling system 4 is made possible.

If the cooling system 4 has regulated an intended temperature in particular within the interior I of the motor vehicle, the cooling system 4 is situated in a steady state. In this steady state, it is advantageous to fill the pressure vessel 14 with $CO_2$ from the cooling system 4 in order to produce a pressure buildup within the pressure vessel 14. The $CO_2$ supplied to the pressure vessel 14 is then available to the extinguishing system 5, in particular for extinguishing a possible fire. Furthermore, the $CO_2$ held available in the pressure vessel 14 can be used to be supplied again to the cooling system 4 if the internal combustion engine 2 is stopped and as a consequence the internal combustion engine 2 no longer drives the compressor 6 via the belt drive 20.

In some embodiments, the control valve 21 can be configured to supply $CO_2$ from the third connection line 12 of the cooling system 4 to the pressure vessel 14, specifically via the seventh connection line 23, the control valve 21 and the sixth connection line 22. In this way, $CO_2$ can be removed from the cooling system 4 from a region upstream of the expansion valve 7 and supplied to the pressure vessel 14 of the extinguishing system 5. In a similar manner, the control valve 21 can be designed to supply $CO_2$ from the first connection line 10 of the cooling system 4 to the pressure vessel 14, specifically via the eighth connection line 24, the control valve 21 and the sixth connection line 22. In this way, $CO_2$ can be removed from the cooling system 4 from a region upstream of the compressor 6 and supplied to the pressure vessel 14 of the extinguishing system 5.

What is claimed is:

1. A combined cooling and extinguishing system for a motor vehicle, the system comprising:
    a cooling system circulating carbon dioxide as a coolant, the cooling system including a compressor, an evaporator, an expansion valve; and a condenser;
    an extinguishing system including a pressure vessel storing compressed $CO_2$; and
    a control valve connected to the pressure vessel and to the cooling system;
    wherein the control valve includes a first setting to supply $CO_2$ from the pressure vessel to the cooling system and a second setting to supply $CO_2$ from the cooling system to the pressure vessel.

2. The combined cooling and extinguishing system as claimed in claim 1, wherein the control valve supplies carbon dioxide to the cooling system if the compressor is not being driven.

3. The combined cooling and extinguishing system as claimed in claim 1, wherein the control valve closes supply of carbon dioxide to the cooling system if the compressor is being driven.

4. The combined cooling and extinguishing system as claimed in claim 1, wherein the control valve moves into a closed position if the extinguishing system releases $CO_2$ for fighting a fire.

5. The combined cooling and extinguishing system as claimed in claim 1, wherein the control valve supplies carbon dioxide to the pressure vessel if the cooling system is at a steady state.

6. The combined cooling and extinguishing system as claimed in claim 1, wherein the control valve comprises an overpressure valve, a thermostat valve, or a solenoid valve.

7. A vehicle comprising:
    at least one traction surface;
    a drive system providing force to the at least one traction surface;
    a cooling system circulating carbon dioxide as a coolant, the cooling system including a compressor, an evaporator, an expansion valve; and a condenser;
    an extinguishing system including a pressure vessel storing compressed $CO_2$; and
    a control valve connected to the pressure vessel and to the cooling system;
    wherein the control valve includes a first setting to supply $CO_2$ from the pressure vessel to the cooling system and a second setting to supply $CO_2$ from the cooling system to the pressure vessel.

8. The vehicle as claimed in claim 7, further comprising:
    an internal combustion engine; and
    a belt drive;
    wherein the internal combustion engine drives the belt drive; and
    the belt drive rotates the compressor.

* * * * *